Patented Apr. 3, 1928.

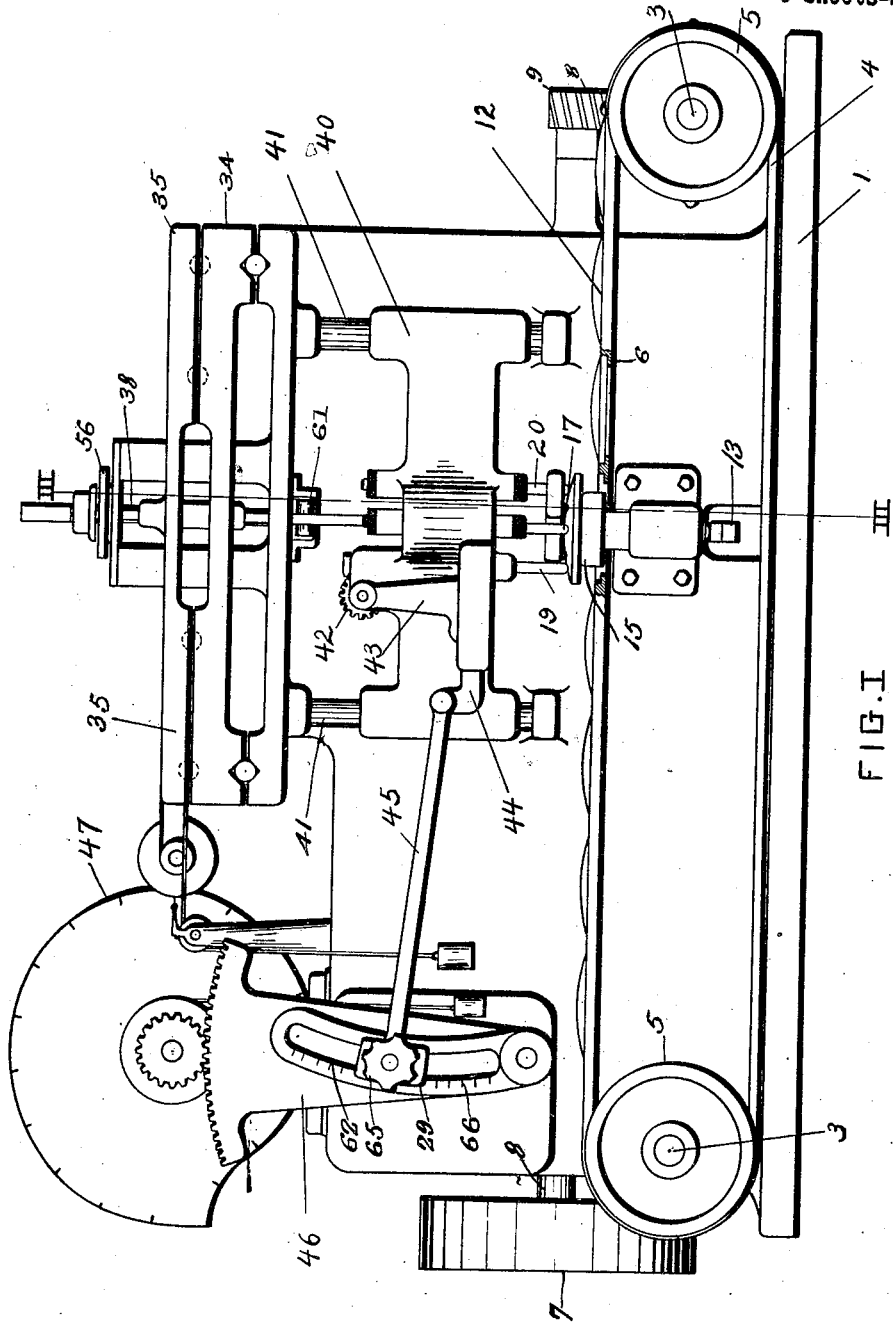

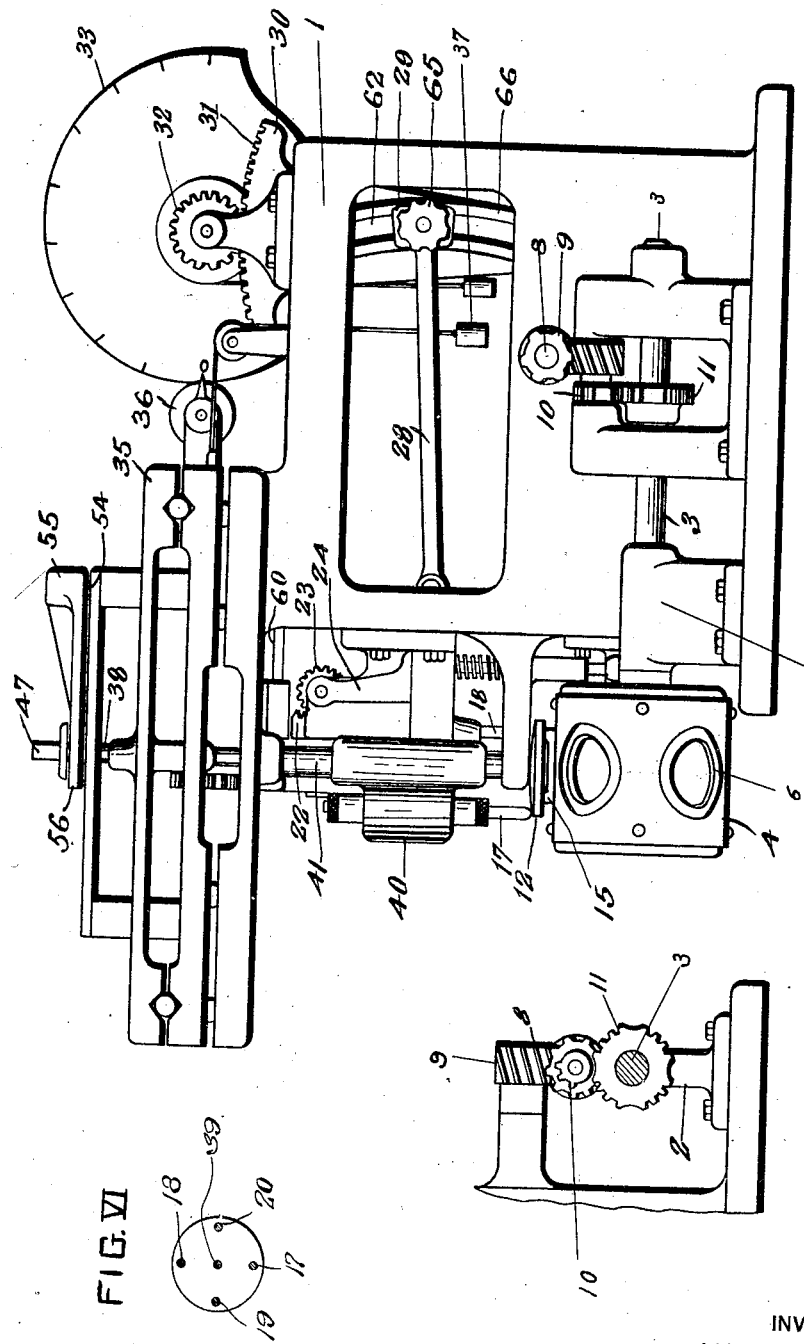

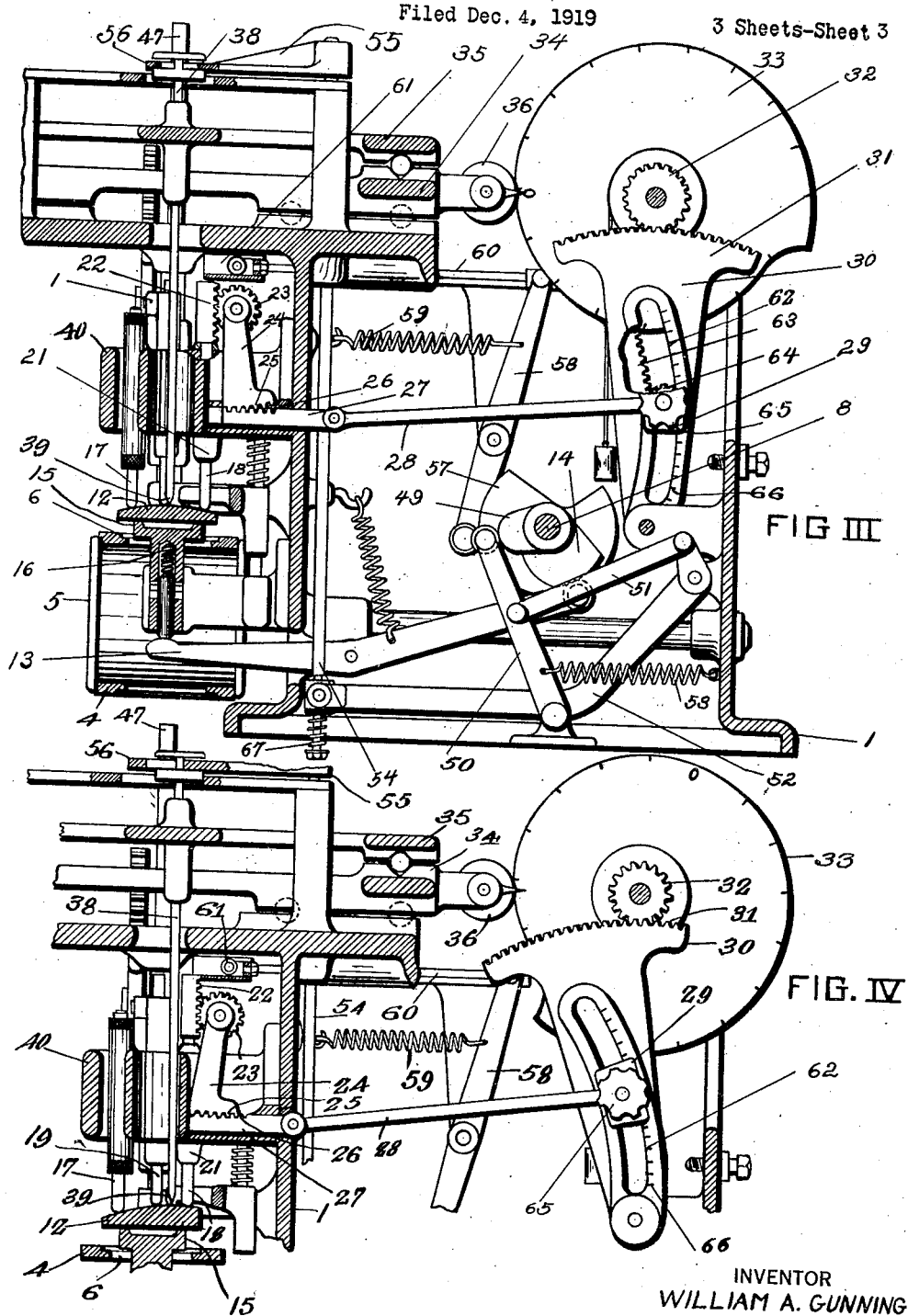

1,664,923

UNITED STATES PATENT OFFICE.

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING MACHINERY.

Application filed December 4, 1919. Serial No. 342,348.

This invention relates to improvements in testing machinery and has particular reference to an improved form of machine adapted for use in connection with curved surfaces such as ophthalmic lenses or articles of similar configuration.

One of the principal objects of the present invention is the provision of a novel and improved machine for automatically determining the optical center, or in other words the highest or lowest point as the case may be, of the curved surface being tested.

A further object of the present invention is the provision of a novel and improved machine for use in connection with marking the optical centers of opthalmic lenses or the like in which the several parts shall operate mechanically as distinguished from optical centering of the lens and in which the several operations may be rendered automatic and dependent entirely upon mechanical action and movements and not upon the judgment of individual examiners.

A further object of the present invention is the provision of a novel and improved machine for the intended purpose which through its automatic operation will enable lenses to be properly centered and marked much more rapidly than is now possible.

Other objects and advantages of my invention should be readily apparent by reference to the following specification taken in connection with the accompanying drawings, and it may be understood that I may make any modifications in specific details of construction shown and described within the scope of the appended claims without departing from or exceeding the spirit of my invention.

Figure I represents a front view of a machine embodying my improvements.

Figure II represents an end view thereof.

Figure III represents a vertical sectional view as on the line 3—3 of Figure I.

Figure IV represents a fragmentary view similar to Figure III showing a different adjustment of the parts there illustrated, and Figure V represents a detailed view of a portion of the operating gearing of the machine.

Figure VI is a detail plan view of the lens showing the measuring and marking pins 17, 18, 19, 20 and 39 in cross section in position on the lens.

In the drawings, the numeral 1 designates the main frame of my machine provided with the bearings 2 for the horizontal shafts 3 of the endless carrier 4 which passes over the drums 5 and is provided with the holders 6 for the lenses which are to be tested and marked. Power is preferably applied to the pulley 7 on the shaft 8 which through the gear connections 9 rotates the pinion segment 10 which co-operates with the mutilated gear 11 on the shaft 3 serving to impart a step by step intermittent movement to the shaft 3 and carrier and thus to shift the carrier to present the lens 12 in operative position in the machine.

The position occupied by the lens will probably be best understood by reference to Figure III from which it will be seen that, as the lens holding portions 6 of the carrier come into operative position, the rock lever 13 is actuated by the cam 14 on the shaft 8 raising the plunger 15 which has a yielding movement through the spring 16. The plunger serves to lift the lens out of its retaining seat 6 and press it upwardly against the series of contact points 17, 18, 19, and 20 these pins being so constructed and the other parts of the machine so balanced that they will through gravity be normally held in depressed position until raised by engagement with a lens therewith. These points are paired in the pair 17—18 and the pair 19—20. The construction and operation of these two sets are identical, though disposed in operative positions at right angles to each other. It is, therefore, believed that a description of the operation of one of these sets will suffice for a clear understanding of both.

In this form of construction the pin 17 is rigidly secured to the frame 1 so as to be held in fixed or immovable position, while the pin or contact member 18 is slidable in the guide 21 and is provided at its upper portion with the rack 22 meshing with the pinion 23 secured to the rock arm 24 which is provided with the segment rack 25 so that sliding movement of the pin 18 through the rack and pinion connection 22 and 23 serves to rock the arm 24. The segment rack 25 in turn is enmeshed with the rack portion 26 of the transverse slide 27 which is in turn connected with the link or pitman 28 which is pivoted to the slide 29 on the cam operating rock arm 30. This rock arm 30 in turn has the segment rack portion 31 meshing with the pinion 32 on the slide controlling cam 33. It will thus be seen that slight movement of the point 18 through the various connections just enumerated will be magnified into a considerable rotative movement of the cam 33. This cam has indicated on it variations amounting to .06 diopter for convenience in locating these points showing that the lens is off-centered to one side or another so that there is this amount of variation in height between the bottom of the point or contacting member 17 and that of the member 18 while the curve of the cam itself is such that it takes care of the variations between these points.

The purpose of the mechanism in question is to determine the center of curve of the lens. This is the center optically considered in a circle, being the highest point if the curve is convex or the lowest point if the curve is concave. If, therefore, the members 17—18 are exactly horizontally alined at their lowest points, they determine a horizontal cord and a perpendicular bisecting that cord will strike the high point or low point of the arc as the case may be. If, however, the point 18 is either higher or lower than the point 17, the cord will then not be horizontal but will be tilted at an angle so that the perpendicular bisector will not be half-way between the points themselves but will be laterally displaced to the right, if the point 18 is lower or to the left, if the point 18 is higher. If desired simply to optically center the lens with respect to the points 17, 18, 19 and 20, the lens could be shifted sideways until through the balancing of the points the cam is rocked back to indicate the zero point.

It is, however, the purpose of my invention to eliminate any shifting of the lens and automatically to mark a center point wherever the same may lie. This I accomplish by providing the universally moving table construction mounted on the upper portion of the frame 1. This comprises the forwardly and rearwardly sliding section 34 having mounted on it the transversely sliding section 35, these parts moving in directions at exact right angles to each other in the usual manner. The section 34 is provided with the roller 36 which contacts with the edge of the cam 33 and is held thereagainst as by the weight 37. Therefore, as the cam rotates, the table will move back and forth and will thus shift and carry with it the sliding spindle member 38 provided with the marking point 39 which will thus be moved over the lens so as to strike the correct point on the transverse curve which is the center point as determined by the mechanism above described.

At the same time it will be understood that the pins 19 and 20 have also been in operation, these pins being mounted in the sliding frame 40 which works vertically on the guides 41 so that the pins 19 and 20 and the associated pinion 42 operate the rock arm 43, slide 44, through link 45, and the main segment arm 46 which serves to rotate the cam 47 and control the movement of the upper transversely shiftable slide 35. The pin 20 is rigidly secured to the slide 40, serving to raise the slide as an entirety, as the lens is shifted upward, without varying the position of the cam 47. When, however, the slide has come to a stationary position, the pin 19 will adapt itself to the shifting of the lens in the same manner as previously described in connection with the pin 18 and will shift its cam giving the proper transverse movement to the slide 35. These combined movements together, therefore, universally shift the spindle 38 until it is in the correct position both forward and rearward and laterally so as to be poised exactly over the center of the longitudinal and transverse curves as has been automatically determined by the machine.

At this point the cam 49 which is rotating with the shaft 8 presses the rock arm 50 forward and serves through the link 51 to rock the bell crank 52 against the tension of the spring 53 forcing the end of the bell crank downwardly to pull down on the operating slide rod 54 and, through the arm 55 and collar 56 on the marking spindle 38, will force the marking point 39 against the lens to indicate properly the center thereon. Immediately thereafter the cam releases the arm 50 when the spring 53 will reversely rock the parts shifting the marking point upward into inoperative position, while just subsequent to this action the cam 57 will release the rock lever 58 which will be shifted by the spring 59 to move the slide rod 60 and bring the inking roller 61 into position to ink properly the point 39 for the next marking operation.

There is one other point to be considered in connection with the operation of my improved machine and that is the fact that on a weak curve lens much greater transverse movement is required to adjust properly for a given curve than is required on a strong curve lens, and it is, therefore, necessary to adjust the amount of rotation given the cam according to the strength of curve of lens or article being tested. This I may accomplish either by varying the cams or by adjustment of my mechanism or both. To facilitate the adjustment of the mechanism I have shown the cam operating the segment arms 30 and 46 as each provided with the arcuate slot 62, having preferably the rack portion 63 with which meshes the adjusting pinion 64 provided with the operating handle 65 serving to shift the slide 29 along the arm in the slot 62 to the necessary position according to the curve to be operated upon, a suitable scale 66 being formed adjacent the slot to facilitate calibration of the adjustment.

From the foregoing description taken in connection with the accompanying drawings, the construction, operation, and advantages of my improved mechanism should be readily apparent, and it will be seen that I have provided a simple and efficient machine in which the lenses may be placed on an endless carrier, will be given a step by step advance automatically, and will be raised against certain contact points, the shifting of these points through suitable mechanism imparting movement to a marking point downward into engagement with the lens to mark the same, a shock absorbing spring 67 being provided to prevent breakage of the lens by undue forcing of the marking point thereagainst, after which the mechanism automatically operates to release the lens in question and to present the next lens beneath a marking point. It will, therefore, be seen that I have provided an improved, simple, and efficient marking machine for centering and marking the centers of ophthalmic lenses or articles of similar nature automatically.

I claim:

1. A machine for the purpose described including an intermittently advancing lens carrier, a marking point, means for bringing the center of a lens on the lens carrier and the marking point into alignment, and means for moving the marking point into and out of contact with the lens on the lens carrier.

2. A machine for the purpose described including an intermittently advancing lens carrier, a marking point, means for centering the marking point above a lens presented by the carrier, and means for actuating the marking point when properly centered.

3. A machine for the purpose described including a support for the lens to be tested, means for marking the lens and means for moving the marking means towards and away from the lens and laterally with respect thereto to position it above the center of the lens.

4. A machine of the character described including a frame, a lens support, a pair of pins carried by the frame in fixed position with respect thereto, a second pair of pins carried by the frame adjacent the first pins and movable perpendicularly with respect to the face of a lens on the lens support, a marking device aligned with the lens support, means for shifting the marking device across the lens on the support to be tested at a predetermined ratio to the amount of movement of the movable pins, and means for moving the marking device into and out of contact with the supported lens.

5. A machine for the purpose described including a lens support, means for intermittently placing a lens on the lens support, means for measuring the relative height of various points on the curved surface of a lens on said support, a marking point, means for supporting said marking point for universal movement with reference to the lens support, and means for positioning the marking point at the average determined by the relative height measuring devices.

6. In a mechanism for the purpose set forth, the combination with a lens support, of a frame thereabove having immovable pins, and pins which are reciprocable substantially perpendicularly to the face of a lens on the support, cams, connections between the reciprocable pins and the cams for rotating the cams and giving movement proportionately to the perpendicular movement of the pins, a marking device aligned with the lens support and supported above the article to be marked, and connections between the marking device and one of the cams for shifting the marking device as the cam rotates.

7. In a mechanism as set forth, the combination with a lens support, of a frame having an immovable pin and a pin which is reciprocable substantially perpendicularly to the face of a lens on the support, a cam, connections between the reciprocable pin and the cam for rotating the cam and giving movement proportionately to the perpendicular movement of the pin, a marking device aligned with the lens support and supported above the article to be marked, connections between the marking device and the cam for shifting the marking device as the cam is rotated, and duplicate shifting mechanisms disposed at right angles to the first and also cooperating with the marking device for varying its position in that direction.

8. In a device of the character described, the combination with a lens support, of a frame above the support bearing fixed pins and additional pins operable perpendicularly with respect to the lens on said support, a rack shiftable by the movable pins, and a dial actuated by the movement of the rack to indicate the amount of decentration of a lens on the lens support as respects the frame.

9. In a machine of the character described, the combination with a lens carrier, of a plunger support for lifting a selected lens from the carrier, a frame disposed above the plunger support and including a fixed contact and a shiftable contact, a rotatable indicator member and connections between the shiftable contact and the indicator member for denoting the amount of decentration of the lens on the lens carrier with respect to the contacts of the frame.

10. A machine of the character described including a lens support, a frame bearing a pair of spaced pins, one of said pins being rigid in the frames and the other of the pins being movable, a marking device disposed between the pins, and a cam operatively connected with the movable pin and engaging the marking device to present the marking device at the center of a lens on the lens support when engaged by the pins.

11. An automatic lens center marking machine including a support for the lens to be marked and a marking device aligned with the lens support, a shiftable support for the marking device, means for shifting the support, a plurality of lens contacts, and connections between the shifting means and the contacts for centering the marking device above the center of the lens on the lens support.

12. In a device of the character described, the combination with means for intermittently presenting a lens to be tested, of means for shifting the lens into testing position, a plurality of contacts for engaging the lens when in testing position, cams associated with certain of the contacts, and shiftable by movement thereof, a marking device table shiftable by action of the cams to center the marking device, and means for bringing the marking device into contact with the lens in the testing position subsequent to the centering action of the cams.

13. A toric lens marking machine including a frame having a support for the lens to be tested, a fixed and a movable pin operatively supported on the frame and adapted for engaging the lens to be tested, a shiftable member on the frame, fixed and movable pins operatively supported on said member parallel with the pins of the first set, with the movable pins adjacent each other, cam means and means operatively connected with the movable pins for actuating said cam means.

14. A toric lens marking machine including a frame having a support for the lens to be tested, a fixed and movable pin operatively supported on the frame and adapted for engaging the lens on the support to be tested, a shiftable member supported on the frame, fixed and movable pins operatively supported on said member parallel with the pins of the first set, with the movable pins adjacent each other, cam means, means operatively connected with the movable pins for actuating said cam means, a universally shiftable marking device, and connections between the marking device and the cams for centering the marking device as respects both meridians of the lens on the lens support being tested.

15. A toric lens marking machine including a frame having a support for the lens to be tested, a fixed and a movable pin operatively supported on said frame and adapted for engaging the lens on the support to be tested, a shiftable member supported on the frame, fixed and movable pins operatively supported on said member parallel with the pins of the first set, with the movable pins adjacent each other, cam means, means operatively connected with the movable pins for actuating said cam means, a universally shiftable marking device, connections between the marking device and the cams for centering the marking device as respects both meridians of the supported lens being tested, and means for automatically bringing the marking point into engagement with the supported lens after it has been properly positioned.

16. In a lens marking machine, a support for the lens, an advancing carrier adapted for placing the lens on the support in a position to be marked, a marking device aligned with the lens support, means for centering the device in marking position above the supported lens when presented, and means for actuating the marking device against the supported lens.

17. In a lens marking machine, a support for the lens, means for placing the lens on the support in a position to be marked, a plurality of parallel pins, certain of which being fixed, others of which being movable perpendicular to the lens support, each of the latter pins being opposite the fixed pins, and means for actuating said movable pins.

18. In a lens marking machine, a lens support, a fixed frame, a movable frame operatively mounted on the fixed frame, a plurality of parallel pins, aligned with the lens support, certain of which being fixed, others of which being movable perpendicularly to the face of the lens when held by the lens support, one of the fixed pins and one of the movable pins being operatively mounted in the fixed frame, the other fixed, and movable pins being operatively mounted on the movable frame.

In testimony whereof I have affixed my signature.

WILLIAM A. GUNNING.